United States Patent [19]

Frey

[11] Patent Number: 5,217,199

[45] Date of Patent: Jun. 8, 1993

[54] CONNECTING VALVE AND HYDRAULIC OIL SAFETY AND POWER SYSTEM IN WHICH THE CONNECTING VALVE IS USED

[75] Inventor: Heinz Frey, Menziken, Switzerland

[73] Assignee: Asea Brown Boveri Ltd., Baden, Switzerland

[21] Appl. No.: 820,145

[22] Filed: Jan. 13, 1992

[30] Foreign Application Priority Data

Jan. 25, 1991 [EP] European Pat. Off. ......... 91100940.5

[51] Int. Cl.$^5$ .......................................... F16K 31/122
[52] U.S. Cl. .................................. 251/29; 251/30.01; 251/63.5
[58] Field of Search ............... 251/62, 63.5, 35, 30.01, 251/29; 137/509

[56] References Cited

U.S. PATENT DOCUMENTS 3,833,200 9/1974 McCombs ............................ 251/35

*Primary Examiner*—Alan Cohan
*Attorney, Agent, or Firm*—Burns, Doane, Swecker & Mathis

[57] ABSTRACT

Connecting valve and hydraulic oil safety and power system in which the connecting valve is used.

This connecting valve (1) has at least one sealing location (5) which is actuated by means of a piston/cylinder arrangement. A piston (3) is subjected to a pressure fluid and moved against the force of a spring (7).

A connecting valve (1) is created which can be inspected for freedom of movement without influencing operation. The hydraulic oil safety and power system should be particularly operationally reliable by means of the connecting valve (1) in accordance with the invention. This is achieved by at least two pipes (17, 18) entering the drive volume (2) offset in the axial direction, of which pipes only one first pipe (17) is initially effective.

11 Claims, 9 Drawing Sheets

Fig.9

# CONNECTING VALVE AND HYDRAULIC OIL SAFETY AND POWER SYSTEM IN WHICH THE CONNECTING VALVE IS USED

BACKGROUND OF THE INVENTION

1. Field of the Invention

This invention relates to a hydraulic oil safety and power system for controlling the supply of steam to a turbine by means of a connecting valve. More particularly, the invention relates to a hydraulic connecting valve system which can be inspected for operational reliability without interrupting the supply of steam to the turbine.

2. Discussion of Background

A connecting valve is known having at least one valve location which is actuated by means of a piston/cylinder arrangement. The piston/cylinder arrangement has a drive volume bounded on one side by the piston. The piston is subjected to a pressure which builds up in the drive volume while forces acting against this build-up of pressure also act on the piston. These forces can again be hydraulically applied pressure forces or also, for example, spring forces.

Such a connecting valve can be actuated and inspected for freedom of movement during a functional inspection but every such actuation has undesirable direct effects on the pressure fluid flow controlled by the valve. Oil is often used as the pressure fluid.

Also known are hydraulic oil safety and power systems in the field of steam supply to a turbine. Such systems act, via a pipework system, on valves and their drives, for example quick-action tripping drives and setting drives, and influence the supply of steam. In such systems, connecting valves are used which, in normal operation, release the supply of the pressure fluid, often oil, into the pipework system.

Such hydraulic oil safety and power systems are often in operation for fairly long periods of time so that the associated connecting valves are not accessible for functional inspections. It is therefore necessary to switch off the complete installation at certain time intervals for inspection purposes; this limits the availability.

SUMMARY OF THE INVENTION

Accordingly, one object of this invention is to create a connecting valve, as claimed in the independent claims which can be inspected for freedom of movement during normal operation without influencing the operation and to provide a hydraulic oil safety and power system in which this connecting valve according to the invention can be advantageously employed.

The essential advantages achieved by means of the invention may be seen in the fact that the operational reliability of the complete installation is substantially increased. Another advantage is that the most important elements of the system can be investigated with respect to their functional capability without interrupting the normal operation of the complete installation or having a disturbing influence on it. This produces a marked increase in the availability of the complete installation.

An additional advantageous effect is that the invention permits the use of a comparatively simple two-pipe system in which the pulses of the safety system are transmitted through the oil power supply pipework system to the valve setting drives. The safety system does not therefore require its own pipework system and this introduces substantial economic advantages. In addition, the number of pipes and their screw-thread locations is substantially reduced with the result that the danger of leakage points, and with it the danger of fire, is substantially reduced.

The further embodiments of the invention are the subject matter of the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
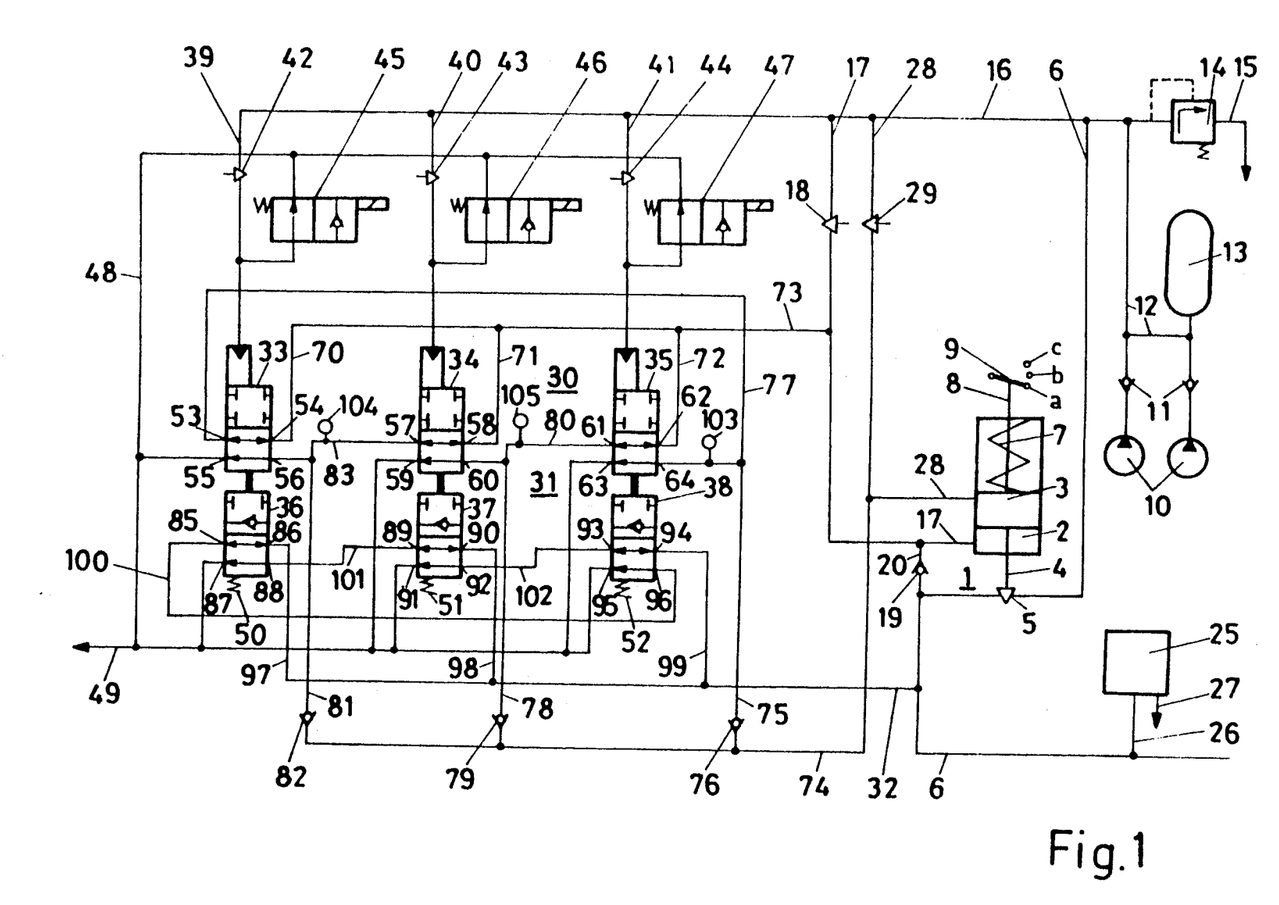
FIG. 1 to FIG. 4 show a first embodiment of the invention in different operating conditions.

Referring now to the drawings, wherein like reference numerals designate identical or corresponding parts throughout the several views, in FIG. 1 a connecting valve 1 in a hydraulic oil and safety power system for the steam supply to a turbine (not shown) is shown diagrammatically. In the position shown, a drive volume 2 is not subjected to pressure and a piston 3 is in its lower end position. The piston 3 is connected to a sealing location 5 via a valve spindle 4. The sealing location 5 may be generally considered as part of a spool valve whose sealing edge completely shuts off a pipe 6 in this lower end position. In this position, the sealing location 5 could also be designed as a seat valve. A spring 7 acts on the other side of the piston 3 and presses the latter into its lower end position. The piston 3 is connected by a rod 8 to a diagrammatically indicated position indicator 9 which can electrically indicate and relay the three positions a, b and c. The position a indication corresponds to the lower end position of the piston 2, i.e. the closed position of the connecting valve 1. The position indicator is advantageously designed as a no-contact end switch.

In this system, oil is used, for example, as the pressure fluid. The oil collects in a drain of known configuration and is fed from there under pressure by means of pressure-controlled pumps 10, via a non-return valve 11 in each case, into a pipe 12. A pressure reservoir 13 also acts on the pipe 12. Other means for generating and maintaining pressure are possible. Excess pressure and pressure peaks occurring in the pipe 12 are relieved into a drain via an excess pressure valve 14 and a pipe 15, as is indicated by an arrow. The pipe 12 enters a pipe 16 which branches off from the pipe 6. In addition, a pipe 17, which is provided with an orifice 18 and enters the drive volume 2 at the bottom, branches off from the pipe 16. The pipe 17 is connected to a pipe 6 via a pipe piece 20 provided with a non-return valve 19. The non-return valve 19 permits a flow of oil from the pipe 17 into the pipe 6. The pipe 6 also leads to a plurality of hydraulically actuated valves which control the turbine steam supply. This figure only shows a valve 25 which is subjected to oil from the pipe 6 via a stub pipe 26. A pipe 27 provided with an arrow indicates the return flow of oil from the valve 25 into the drain.

A further pipe 28, which is connected to the drive volume 2 via an orifice 29, branches off from the pipe 16. The pipe 28 enters the drive volume 2 offset in the axial direction above the pipe 17. In the position of the connecting valve 1 shown, the inlet from the pipe 28 is closed by the piston 3.

A first three-channel hydraulic two-from-three circuit 30 is provided for the control of the movements of the connecting valve 1. A second three-channel hydraulic two-from-three circuit 31 monitors the pressure in the pipe 6; it is in effective connection with the pipe 6 via a pipe 32. The first two-from-three circuit 30 has one valve 33, 34, 35 per channel and the second two-from-three circuit 31 also has one valve 36, 37, 38 per channel. The valves are mechanically connected to make one hydraulically actuated unit per channel, the valve 33 to the valve 36, the valve 34 to the valve 37 and the valve 35 to the valve 38. The hydraulic actuation takes place from the pipe 16 via one stub pipe 39, 40, 41 per channel, each of the stub pipes 39, 40, 41 being provided with an orifice 42, 43, 44. The deactivation of the hydraulic actuation takes place by means of one solenoid valve 45, 46, 47 per channel. The solenoid valves 45, 46, 47 are shown in the unexcited condition in FIG. 1; they are pressed into the position shown by the diagrammatically indicated springs so that the stub pipes 39, 40, 41 are relieved of pressure after the orifices 42, 43, 44 by a pipe 48 into a drain 49. The valves of the two-from-three circuits 30 and 31 are also pressed into the position shown by the diagrammatically represented springs 50, 51 and 52.

The valve 33 has four connections 53, 54, 55, 56, the valve 34 has four connections 57, 58, 59, 60 and the valve 35 has four connections 61, 62, 63, 64. The position of the connections may be seen in FIG. 1. The connections 54, 58 and 62 are each connected by one stub pipe 70, 71, 72 to a pipe 73 which branches off from the pipe 17. A pipe 74 branches off from the pipe 28. A stub pipe 75, which has a non-return valve 76 permitting a flow of oil into the stub pipe 75, branches off from the pipe 74. The stub pipe 75 enters a connecting pipe 77 between the connection 64 of the valve 35 and the connection 53 of the valve 33. A second stub pipe 78, which has a non-return valve 79 permitting the flow of oil into the stub pipe 78, branches off from the pipe 74. The stub pipe 78 enters a connecting pipe 80 between the connection 61 of the valve 35 and the connection 60 of the valve 34. A third stub pipe 81, which has a non-return valve 82 permitting the flow of oil into the stub pipe 81, branches off from the pipe 74. The stub pipe 81 enters a connecting pipe 83 between the connection 57 of the valve 34 and the connection 56 of the valve 33. The connection 55 of the valve 33, the connection 59 of the valve 34 and the connection 63 of the valve 35 are each connected directly to the drain 49.

The valve 36 has four connections 85, 86, 87, 88, the valve 37 has four connections 89, 90, 91, 92 and the valve 38 has four connections 93, 94, 95, 96. The position of the connections may be seen in FIG. 1. The connections 86, 90 and 94 are each connected via a stub pipe 97, 98 and 99 to the pipe 32 and, via the latter, to the pipe 6. The connection 85 of the valve 36 is connected to the connection 96 of the valve 38 via a connecting pipe 100. The connection 88 of the valve 36 is connected to the connection 89 of the valve 37 via a connecting pipe 101. The connection 92 of the valve 37 is connected to the connection 93 of the valve 38 via a connecting pipe 102. The connection 87 of the valve 36, the connection 91 of the valve 37 and the connection 95 of the valve 38 are each connected directly to the drain 49.

The connecting pipes 77, 80 and 83 can each be provided with a pressure monitor 103, 104, 105, which measures the respective pressures in the connecting pipes. Each of these pressure monitors can, for example, contain a piezoelectric measuring element which operates without mechanical contact and, therefore, practically without maintenance. Each of the pressure monitors 103, 104, 105 responds when the pressure is less than a set minimum pressure value and emits an electric signal to a higher-level installation technical control system (not shown) where this signal is further processed.

In FIG. 1, the first two-from-three circuit 30 and the second two-from-three circuit 31 are shown in the deactivated condition, i.e. they are not subjected to oil pressure, so that the valves 33 to 38 are pressed into the lower switch position (shown diagrammatically in each case) by the springs 50, 51, 52. In the case of the valve 33, the connections 53 and 54 are then connected together so that oil can flow in both directions. In addition, the connections 55 and 56 are connected in such a way that oil can flow out at the connection 55. The other valves 34 to 38 are in corresponding positions.

In the second switching position of the valves 33, 34 and 35, the connections respectively located opposite to one another in pairs are separated and, in this position, no oil can flow through the particular valve. In their second switching position, the valves 36, 37 and 38 also shut off the flow of oil. The lower connections in each case are separated by a valve location, designed as a seat valve, which blocks outflow of oil from the particular valve in the direction of the drain 49. This design acts advantageously with respect to operational safety.

Figure 5:
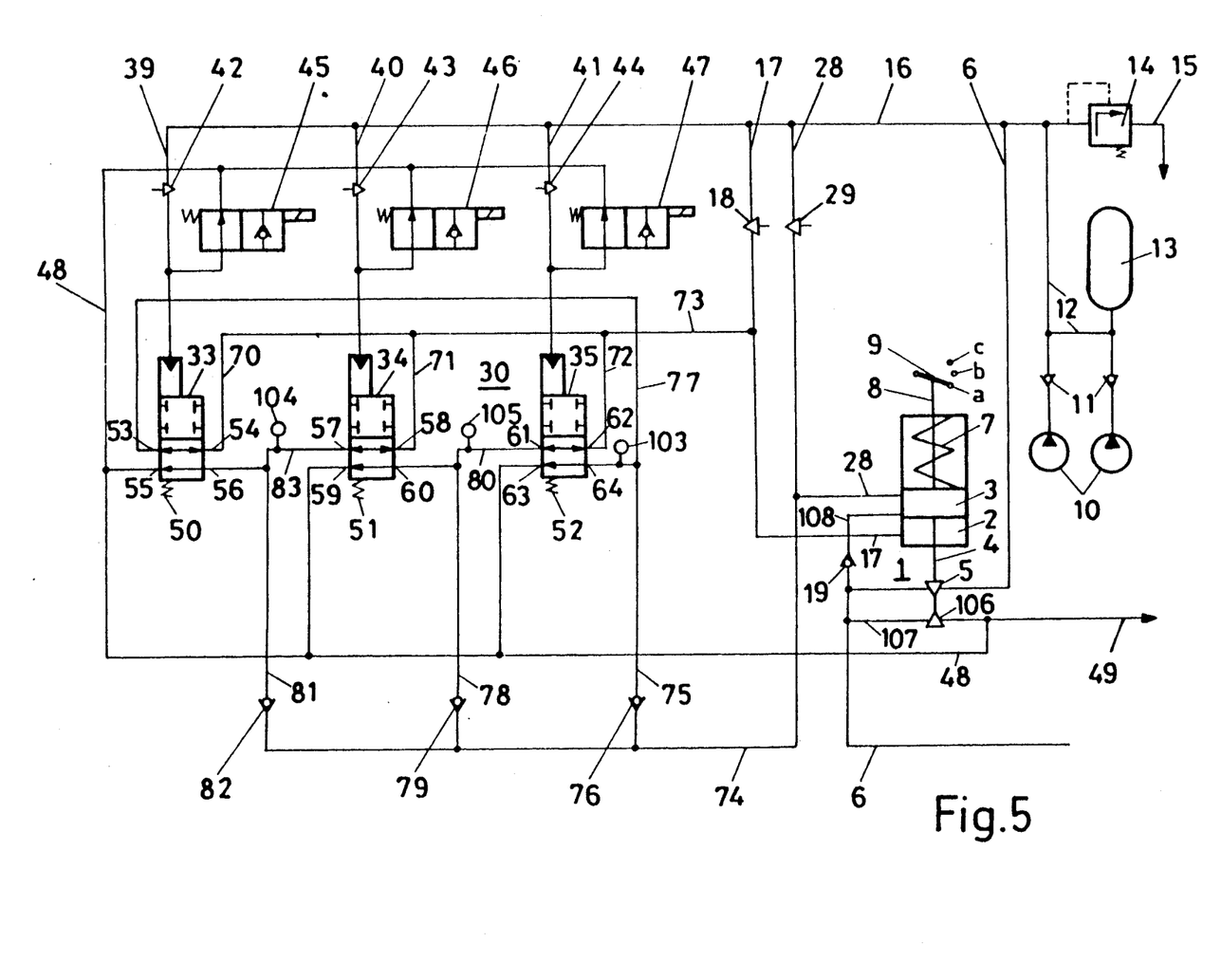
FIG. 5 to FIG. 8 show a second embodiment of the invention in different operating conditions and FIG. 9 shows a third embodiment of the invention.

A further, somewhat simplified embodiment of the invention, may be seen in FIG. 5. Compared with FIG. 1, this embodiment differs in the fact that it has only one two-from-three circuit 30 and that the connecting valve 1 has a further sealing location 106 in addition to the sealing location 5. In the position of the connecting valve 1 shown, this sealing location 106 frees a pipe 107, which branches off from the pipe 6, so that oil can flow from the pipe 6 into the drain 49. A further pipe 108 emerges into the drive volume 2 offset in the axial direction between the pipes 17 and 28. This pipe 108 enters the pipe 6 via a non-return valve 19, the non-return valve 19 permitting a flow of oil out of the drive volume 2 as soon as the drive piston 3 frees the cross-section of the pipe 108.

Figure 9:
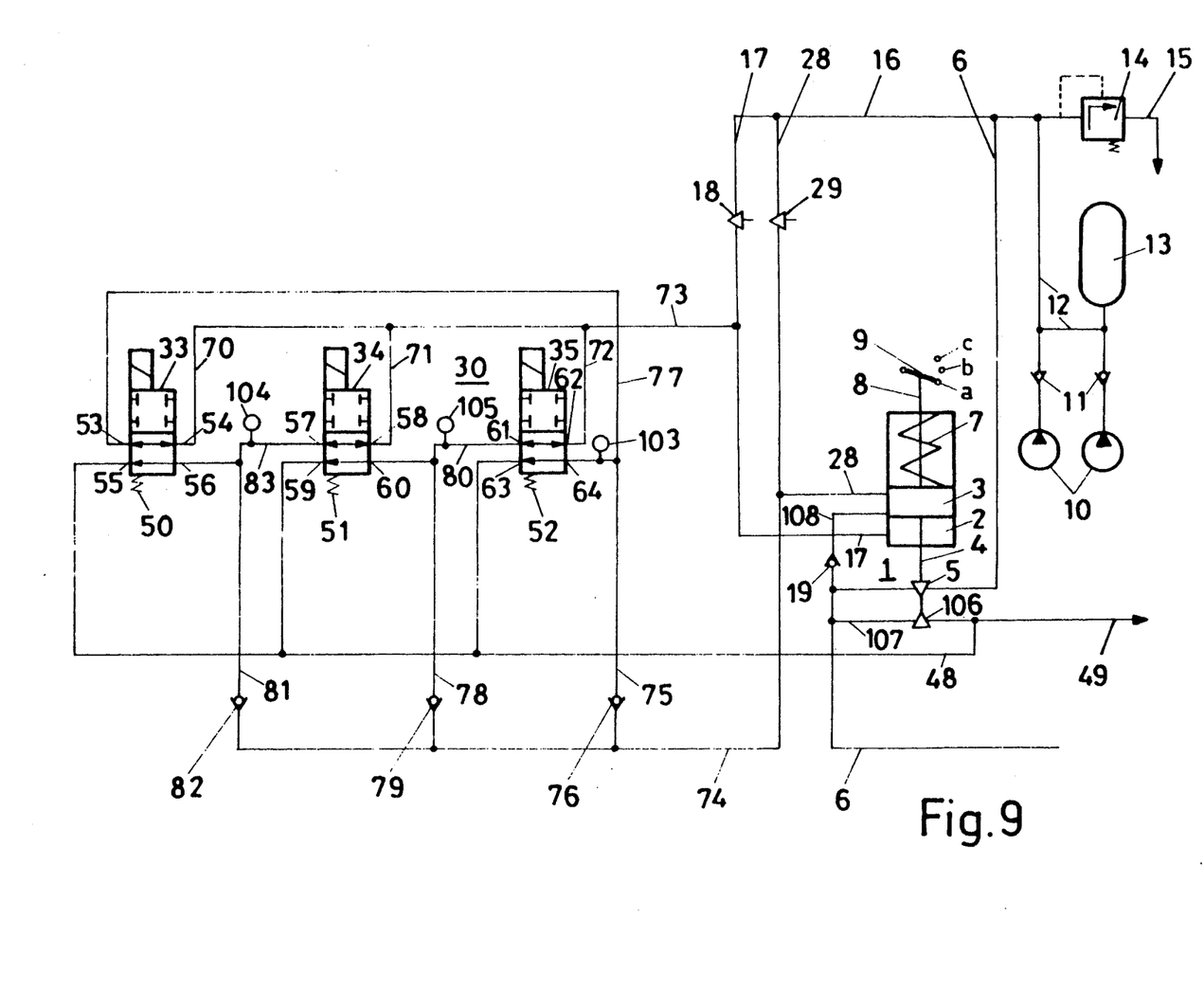

A further embodiment of the invention, simplified relative to the design of FIG. 5, may be seen in FIG. 9. This embodiment differs from FIG. 5 in the fact that the two-from-three circuit is actuated electromagnetically. As indicated in the figure, each of the valves 33, 34 and 35 is provided with a separate trip magnet. These trip magnets can be electrically excited from a higher-level installation technical control system. The trip magnets actuate the valves 33, 34 and 35, which are designed as spool valves, against the force of the springs 50, 51 and 52.

In order to explain the mode of operation, FIG. 1 is first considered in more detail. The arrangement is in the completely deactivated condition. The oil pressure from the stub pipes 39, 40 and 41 is relieved by means of the solenoid valves 45, 46, 47 and through the pipe 48 into the drain 49 so that the valves of both the twofrom-three circuits 30, 31 are pressed by the springs 50, 51, 52 into the position shown. The drive volume 2 is relieved of pressure through the pipes 17 and 73, the stub pipe 70, through the valve 33 into the connecting pipe 77 and through the valve 35 into the drain 49. Pressure relief into the drain 49 also takes place in parallel with the path just mentioned via the stub pipes 71 and 70 and the connecting pipes 83 and 80, respectively. The sealing location 5 is closed so that no larger quantities of oil can be fed in under pressure. Only smaller quantities of oil can be fed in through the orifices 18 and 29 but these are led away via the pipes 73 and 74 into the drain 49. The stub pipes 75, 78 and 81 lead from the pipe 74 into the connecting pipes 77, 80 and 83 and from there on into the drain 49.

In addition, the drive volume 2 is relieved of pressure via the pipe 17, the pipe piece 20, the pipe 6 and the pipe 32. The pipe 6 is completely relieved of pressure via the pipe 32 so that the valve 25 and any other valves connected are in the off position, i.e. the steam supply to the turbine is switched off. From the pipe 32, the relief of pressure takes place along three parallel paths into the drain 49 : firstly via the stub pipe 97, through the valve 36, the connecting pipe 100 and through the valve 38, secondly via the stub pipe 98, through the valve 37, the connecting pipe 101 and through the valve 36 and thirdly via the stub pipe 99, through the valve 38, the connecting pipe 102 and through the valve 37.

Figure 2:
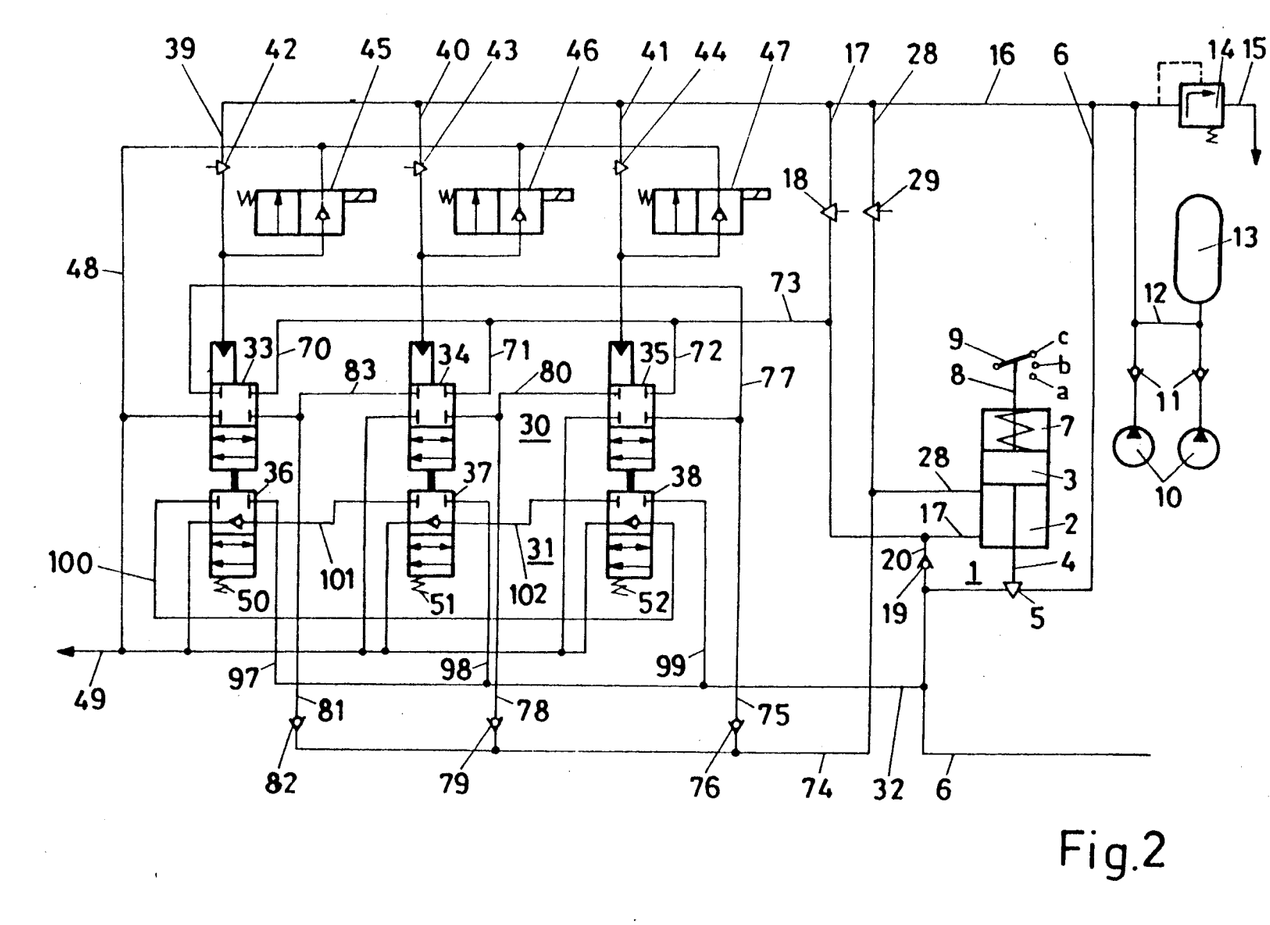

FIG. 2 shows the arrangement of FIG. 1 in full operation. The transition from one operating condition into the other is described below. The solenoid valves 45, 46, 47 are first excited so that they take up the position shown in FIG. 2. The pipe 16 is now no longer relieved of pressure via a relatively large cross-section so that oil pressure generated by the pumps 10 can build up in it. The oil pressure acts via the stub pipes 39, 40, ,41 on the two-from-three circuits 30, 31 and moves their valves 33 to 38 into the position shown in FIG. 2 so that oil cannot reach the drain 49 through these valves either. Oil, whose quantity is limited by the orifice 18, flows in through the pipe 17. The connecting valve initially remains in the position shown in FIG. 1 because no pressure can build up in the drive volume 2 before the pipe 6, and the pipe system fed by it, has been filled. Oil flows initially through the pipe piece 20 into the pipe 6 and fills this pipe 6 and the pipework system connected to it. The filling procedure is determined, as already stated, by the orifice 18. Any air present in the pipe 6 is ejected from the system by bleeds and leaks which are always present. As soon as the system has been filled, and of course also the pipes in the region of the two two-from-three circuits 30, 31, via the pipes 73 and 74, the oil pressure increases, also in particular in the drive volume 2. As soon as a particular value, for example 5 bar, has been exceeded, the connecting valve 1 opens, the sealing location 5 frees the full cross-section of the pipe 6 and oil is supplied through the pipe 6 up to the full operating pressure. The switchover from feeding through the pipe 17 to the pipe 6 takes place without any appreciable pressure surges and this advantageously extends the life of the arrangement.

The piston 3 of the connecting valve 1 is now pressed upwards against the force of the spring 7 until it frees the pipe 28 through which, in parallel with the pipe 17, additional oil is fed under pressure into the drive volume 2 until the end position indicated in FIG. 2 is reached. The position indicator 9 now indicates the position c. This position c is taken up in the normal operating condition of the hydraulic oil safety and power system.

Figure 3:
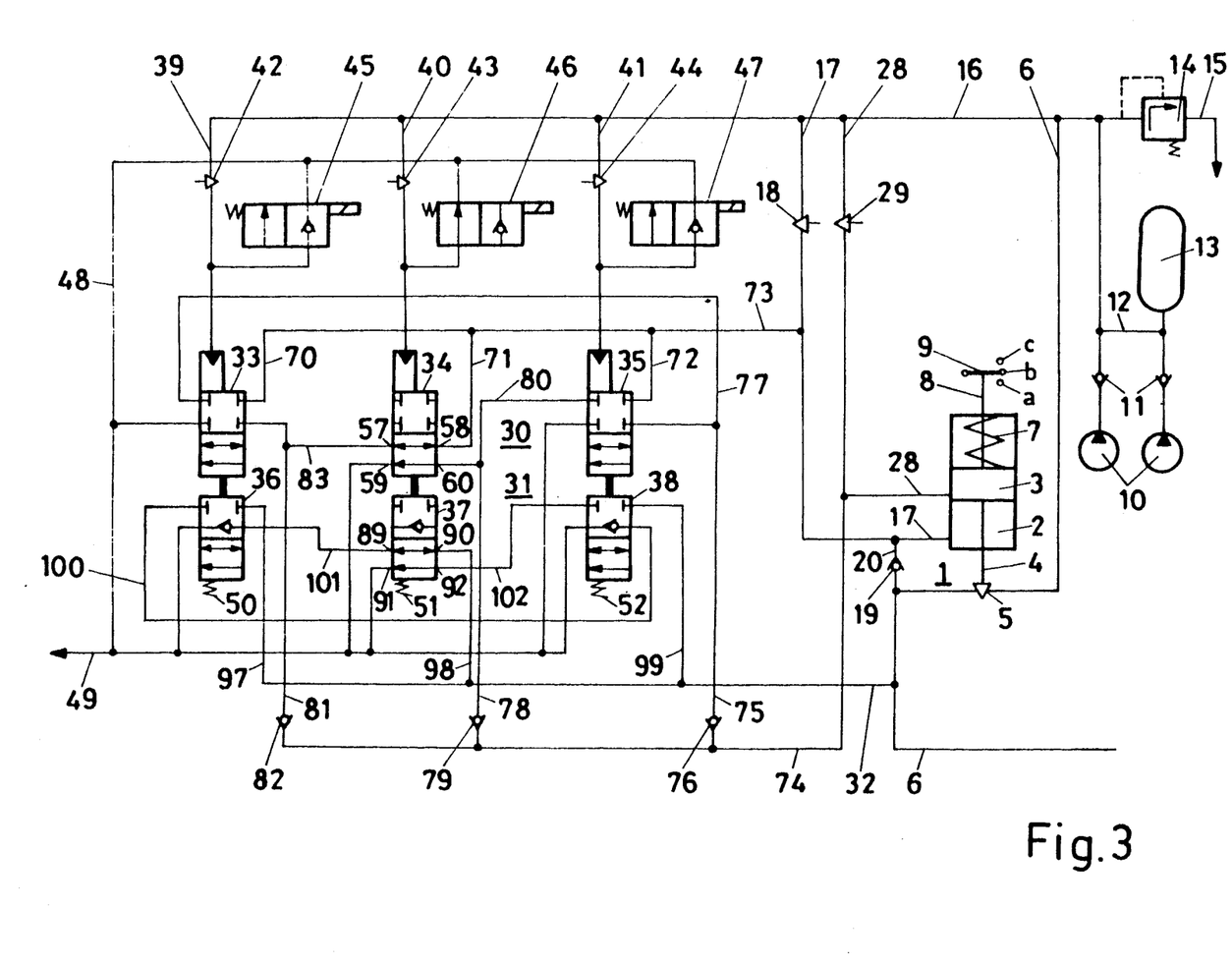

The normal operating condition generally lasts for a relatively very long period so that, considering the importance of the connecting valve 1 to the complete system, it appears desirable to check it now and again for freedom of movement. An unrecognized failure of this connecting valve 1 could cause severe consequential damage in the installation should it not operate correctly in the case of a fault. A freedom of movement inspection is, for example, introduced by deactivating the solenoid valve 46, as shown in FIG. 3. The consequence of this deactivation is that one channel of the two two-from-three circuits 30, 31 with the valves 34 and 37 is no longer subjected to pressure via the pipe 40 so that the valves 34 and 37 are pressed by the force of the spring 51 into the control position shown. The actuation of the valve 37 has no effect on the pressure in the pipe 6 because the two adjacent valves 36 and 38 continue to prevent a drop in pressure in the pipe 6. Oil passes, on the other hand, through the valve 34 from the drive volume 2 into the drain 49, this taking place along the path through the pipes 28, 74, 78 into the connecting pipe 80 and from there to the connection 60 and through the valve 34 to the connection 59 which is directly connected to the drain 49. The oil continues to drain in this way until the piston 3 completely closes the inlet of the pipe 28 into the drive volume 2. The position indicator 9 then indicates the position b. The movement in the closing direction which the piston 3 has executed still has no effect on the valve cross-section freed by the sealing location 5 so that the pressure feed through the pipe 6 is not throttled during this freedom of movement inspection of the piston 3. The installation, therefore, is not affected by this inspection. After renewed excitation of the solenoid valve 46, the latter closes the pressure relief of the pipe 40 again and the resulting pressure there closes the valves 34 and 37 again. The oil flowing in under pressure through the pipe 17 and, later, simultaneously through the pipe 28 subsequently presses the piston 3 back into the end position c.

The indication of the position b by the position indicator 9 is registered and evaluated by the higher-level installation technical control system. The functional capability of the connecting valve 1 is confirmed by this means and, at the same time, the functional capability of the central channel of the two two-from-three circuits 30, 31 is also confirmed. Generally speaking, all three channels are checked through one after the other, this ensuring a relatively high level of safety and availability for the installation. If one channel of the two-from-three circuits 30, 31 should be faulty, the indication of the position b, which then necessarily follows, can also be considered as a warning signal to the installation technical control system.

Figure 4:
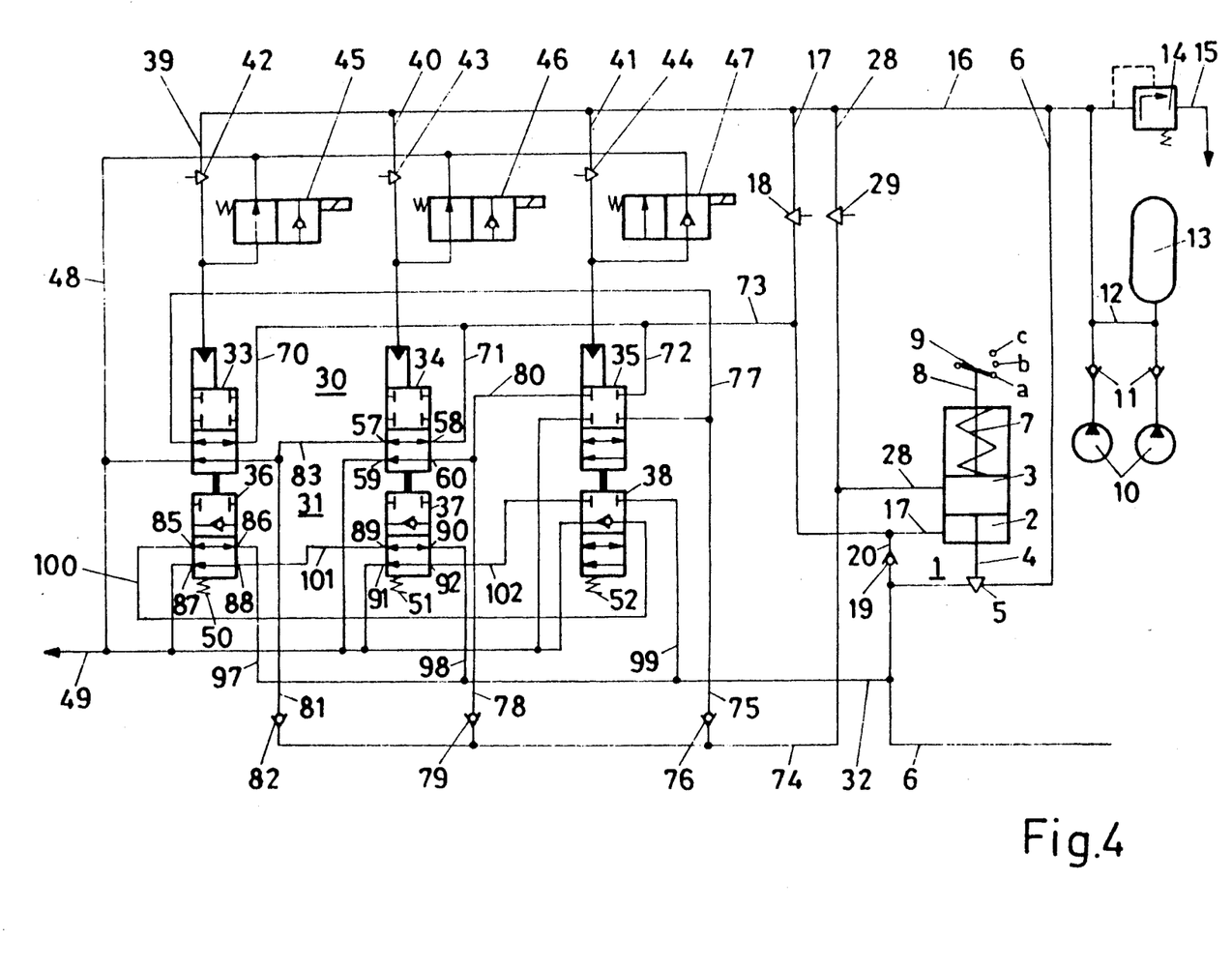

When the system is switched off in the case of a fault, the oil supply through the pipe 6 must be interrupted with a high level of reliability. The turbine steam supply must be reliably interrupted in this case, i.e. the valves which are subject to pressure through the pipe 6 must close. Such a closing procedure is introduced by interruption of the pipe 6 by the connecting valve 1 and the pressure in the pipe 6 is relieved into the drain 49 exclusively via the correspondingly connected second two-from-three circuit 31, as shown for example in FIG. 1, so that the valves initially held in the open position by this pressure are deactivated and can close. For the introduction of a desired closing procedure, however, it is also sufficient for only two channels of the two-from-three circuits 30 and 31 to be deactivated, as shown in FIG. 4. The pipe 6 and the pipework system supplied by it are relieved of pressure through the valves 36 and 37. In parallel with the relief of pressure taking place through the pipe 17, the drive volume 2 is initially relieved of pressure through the pipes 28 and 74 via the valves 33 and 34 until such times as the piston 3 closes off the pipe 28. The closing motion of the connecting valve 1 is advantageously accelerated by this means and the duration in time of the closing procedure is shortened.

Figure 6:
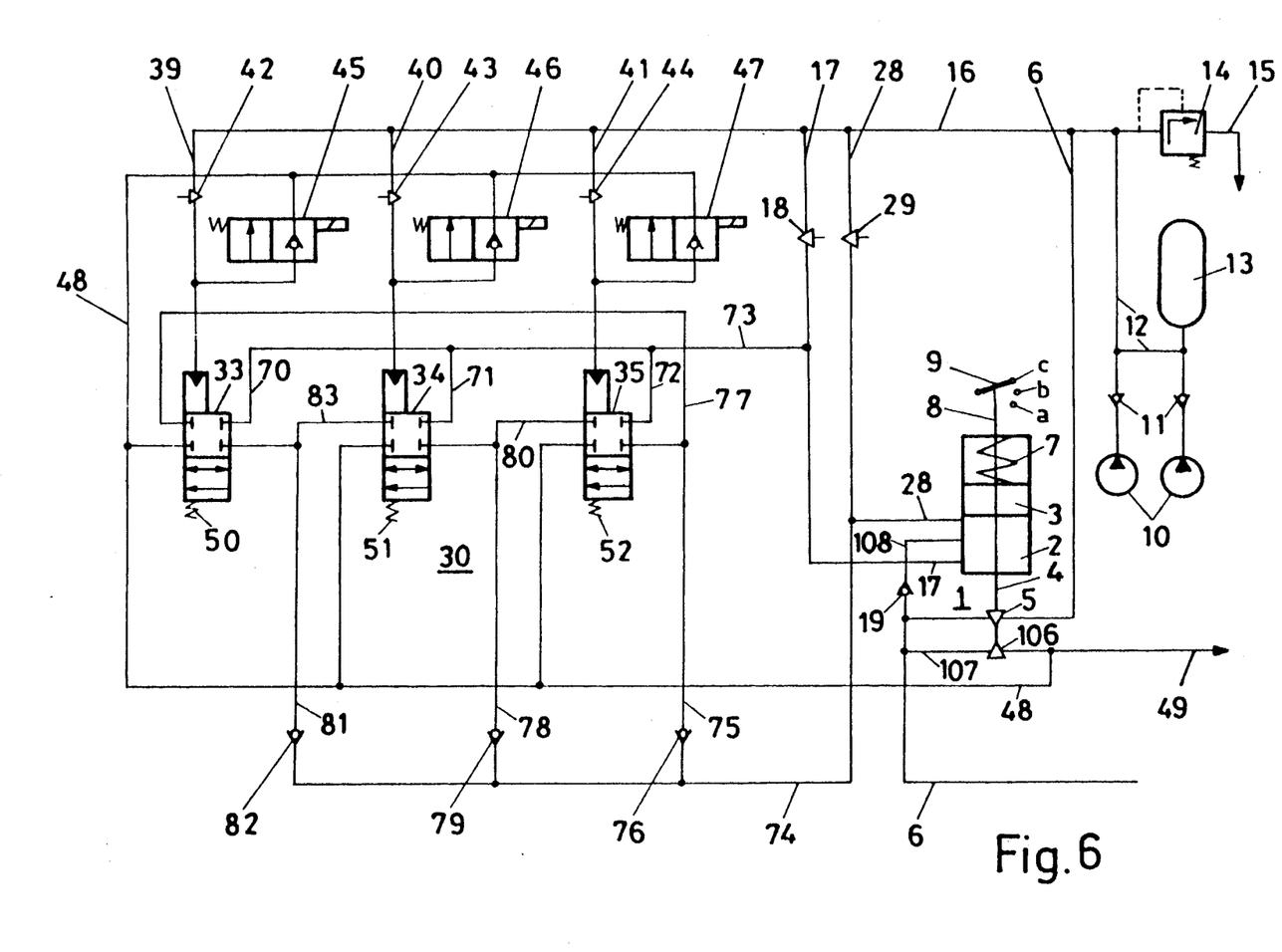

The two-from-three circuit 30 in FIG. 5 operates just like the corresponding circuit in FIG. 1 and does not need to be further described here. The completely deactivated condition of the installation is shown in FIG. 5. If the installation has to be run up, oil flows in under pressure through the pipe 17 as limited by the orifice 18 but the solenoid valves 45, 46 and 47 are excited, as shown in FIG. 6, with the corresponding effects on the two-from-three circuit 30. The oil flows into the drive volume 2 of the connecting valve 1 and a pressure builds up there which cannot initially escape. As soon as the pressure is sufficiently large to overcome the force of the spring 7, the connecting valve 1 moves upwards but only until the piston 3 frees the pipe 108. In this position, the sealing location 106 has already closed off the pipe 107 from the drain 49. Oil now flows through the freed pipe 108 from the drive volume 2 through the non-return valve 19 into the pipe 6, filling the latter and the pipework system connected to it. Only when this system has been filled and a pressure of, for example, 5 bar has been reached, does the piston 3 move upwards again and the sealing location 5 frees the full cross-section of the pipe 6 for the supply of oil under pressure. The piston 3 moves further upwards and then frees the cross-section of the pipe 28 before it reaches the end position c, as is shown in FIG. 6. During this procedure, the sealing location 106 always remains closed.

Figure 7:
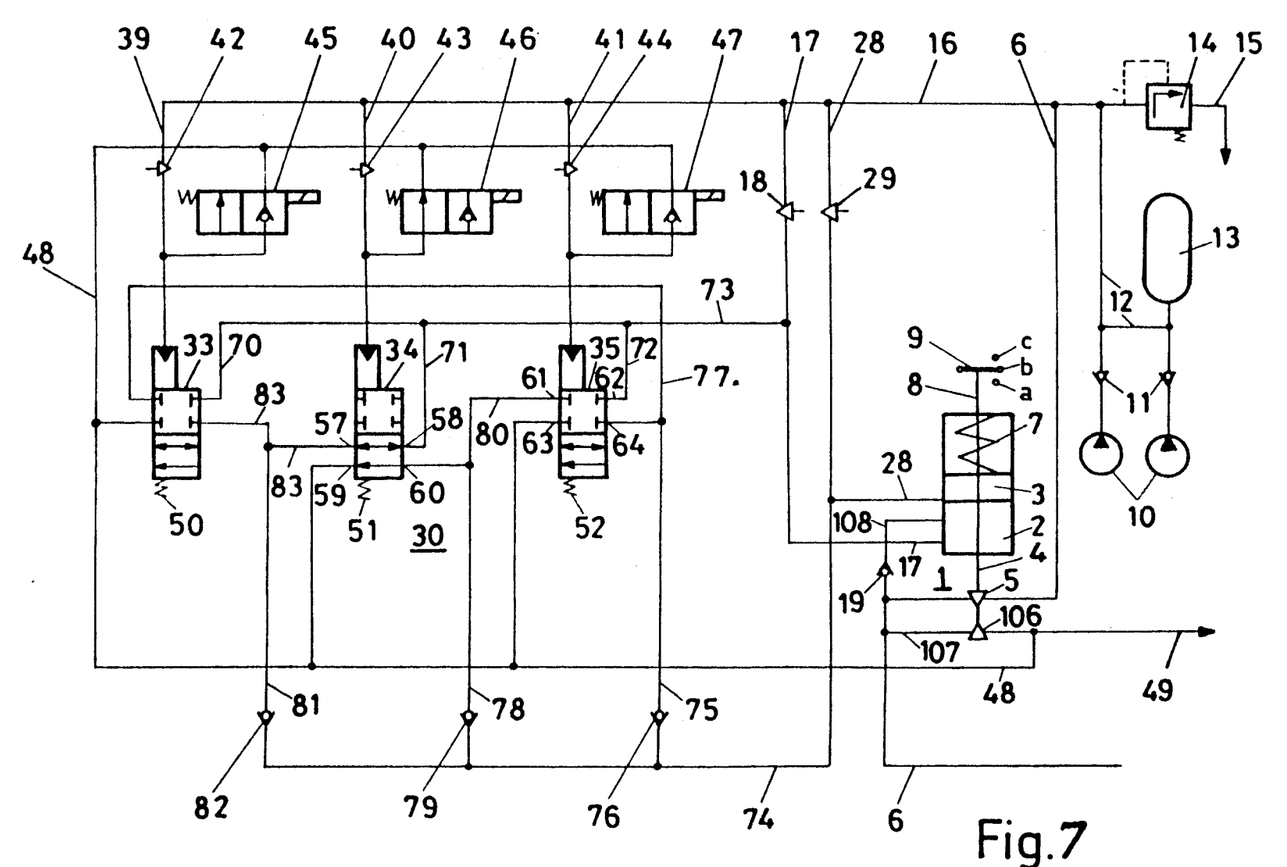
Figure 8:
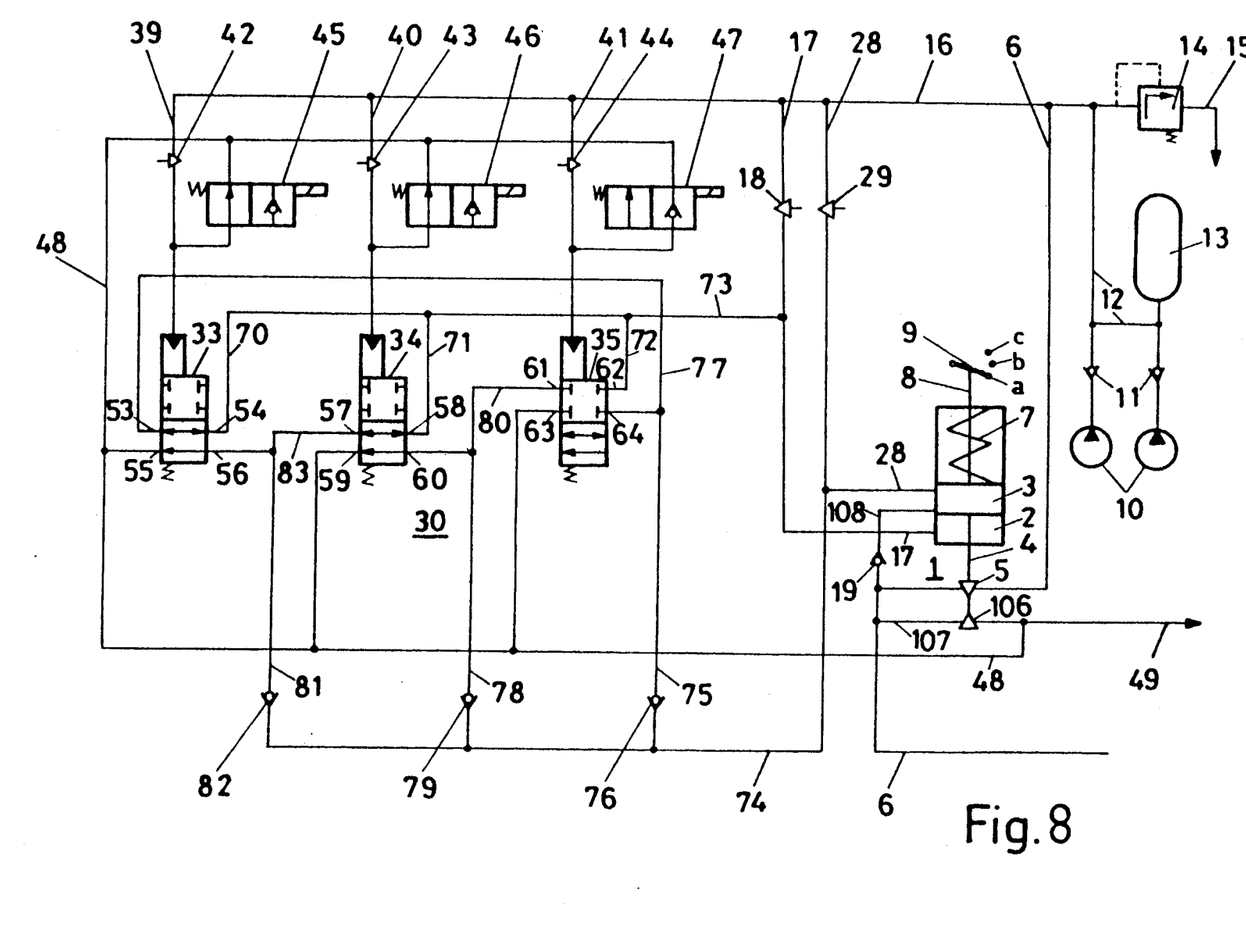

A freedom of movement inspection of the connecting valve 1 is also possible with this embodiment of the invention, as is shown in FIG. 7, if the solenoid valve 46 or one of the other two solenoid valves 45 and 47 is deactivated. The procedure has already been analogously described in connection with FIG. 3 and will not be explained again here. A desired and normal switch-off procedure is also shown for this embodiment of the invention in FIG. 8 for completeness but there is no necessity to explain it comprehensively because it is similar in principle to FIG. 4. The connecting valve 1 is designed in this case in such a way that one of the two sealing locations 5, 106 is always open while the other is closed. In particular, the sealing location 106 only frees the pipe 107 when the sealing location 5 is closed. The total pressure relief for the pipe 6 and the connected pipework system takes place in this case via the pipe 107 into the drain 49 whenever the system is deactivated.

The two-from-three circuit in FIG. 9 operates like the corresponding circuit in FIG. 1 but the hydraulic actuation of the valves 33, 34 and 35 is replaced by electromagnetic actuation. The completely deactivated condition of the installation, similar to that in FIG. 5, is shown in FIG. 9. The other operating conditions and also the transitions between the individual operating conditions can be correspondingly taken from FIG. 5 to 8 and the description associated with these figures so that any further explanation is unnecessary at this point.

The valves 33, 34 and 35 are designed as spool valves although it is known that spool valves tend to jam when they are not operated for a fairly long time. Since, as already stated, functional inspections are possible using the arrangement according to the invention without influencing the pressure in the pipe 6 and, therefore, the operating behavior of the associated turbine, the use of spool valves is possible in this case. Functional inspections of the valves 33, 34 and 35 are carried out sufficiently often that jamming of these valves cannot occur. If, nevertheless, jamming should occur, this is recognized rapidly and in good time and corrective action is possible.

The functional inspections mentioned can be carried out each time during the freedom of movement inspection of the connecting valve 1. Additional monitoring, which is capable of recognizing an imminent fault, is also possible. In this, the time from the issue of the instruction for an electromagnetic initiation of one of the valves 33, 34 and 35 to the response of the pressure switch 103, 104, 105 associated with the appropriate valve is measured by the correspondingly designed installation technical control system and, in addition, the time until the connecting valve 1 has reached the position b can also be determined. This time measurement or the time measurements are compared with the required value data stored in the installation technical control system so that conclusions about the particular cause can be drawn at any time from the deviation from the required value data. Generally speaking, even small deviations are recognized so that corrective measures can be introduced before a serious fault can develop. These functional inspections are undertaken periodically and are generally carried out and evaluated completely automatically by the installation technical control system but it is also quite possible, if required, to intervene manually and to carry out these functional inspections independently of the installation technical control system. The fully automatic and manually introduced functional inspection procedures are mutually interlocked, however, so that defined operating conditions are always maintained. In addition, the automatic functional inspections are prevented if a defect already exists in the installation and this has not yet been corrected.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A hydraulic oil safety and power system for the supply of steam to a turbine having at least one steam valve, comprising:
   a connecting valve having at least one valve sealing location;
   a cylinder forming a cylindrical drive volume subjected to a pressure fluid;
   a piston, slidably carried in the cylinder;
   the drive volume bounded on one side by the piston;
   means for actuating the valve sealing location by movement of the piston;
   means for urging the piston to a lower end position when the drive volume is not subjected to pressure fluid;

at least two pipes connected to the cylinder offset in the axial direction for subjecting the drive volume to pressure fluid;

only a first pipe of the at least two pipes positioned for permitting a flow of pressure fluid into the drive volume when the piston is in the lower end position;

a second pipe positioned to be sealed by a sealing edge of the piston when the piston is in the lower end position, wherein the valve sealing location actuating means is arranged so that movement of the piston actuates the sealing location to release the full inlet flow cross-section of the connecting valve before movement of the piston unseals the second pipe, and wherein release of pressure fluid through the second pipe initiates a partial stroke of the piston which ceases when the second pipe is sealed by the piston sealing edge, the partial stroke not affecting the valve sealing location actuating means.

2. The hydraulic oil safety and power system as claimed in claim 1, wherein the connecting valve further comprises a second sealing location acting on a pipe to a drain for the pressure fluid and means for actuating the second sealing location by movement of the piston, the second sealing location and actuating means arranged so that upon movement of the piston initially closes the pipe into the drain before the first sealing location has released the full inlet flow cross-section of the connecting valve.

3. The hydraulic oil safety and power system as claimed in claim 2, wherein the connecting valve further comprises:

a third pipe connected to the cylinder for subjecting the drive volume to a pressure fluid offset in the axial direction between the first and second pipes, the third pipe positioned to be sealed by a sealing edge of the piston when the piston is in the lower end position, wherein movement of the piston permits pressure fluid to flow out of the third pipe after the sealing edge of the piston has freed its pipe cross-section.

4. The hydraulic oil safety and power system as claimed in claim 1 further comprising:

a pipework system for the hydraulic actuation of the at least one steam valve wherein pressure fluid is fed into the pipework system via the connecting valve.

5. The hydraulic oil safety and power system as claimed in claim 4, further comprising a first multi-channel hydraulic two-from-three circuit integrated in the pipe system for controlling the flow of pressure fluid in the first pipe and the second pipe.

6. The hydraulic oil safety and power system as claimed in claim 5, further comprising a solenoid valve integrated in each channel of the multi-channel circuit for actuating the hydraulic two-from-three circuit.

7. The hydraulic oil safety and power system as claimed in claim 5, further comprising an electromagnet means associated with each channel of the multi-channel circuit for electromagnetically actuating the hydraulic two-from-three circuit.

8. The hydraulic oil safety and power system as claimed in claim 5, further comprising a second multi-channel hydraulic two-from-three circuit integrated in the pipework system for the monitoring of the pressure in the pipework system.

9. The hydraulic oil safety and power system as claimed in claim 8, wherein the first two-from-three circuit and the second two-from-three circuit are mechanically connected together in each channel, and a solenoid valve is integrated with each channel for the actuation of each channel.

10. The hydraulic oil safety and power system as claimed in claim 8, wherein the first hydraulic two-from-three circuit, further comprises a pressure switch in each connecting pipe connecting the channels for monitoring valves of this circuit.

11. The hydraulic oil safety and power system as claimed in claim 4, further comprising a sensor means connected to the connecting valve for monitoring the particular condition of the connecting valve.

* * * * *